United States Patent
Waldschütz et al.

(10) Patent No.: US 12,418,076 B2
(45) Date of Patent: Sep. 16, 2025

(54) DEVICE FOR MAKING RELEASABLE CONTACT WITH A BATTERY CELL

(71) Applicant: John Deere Electric Powertrain LLC, Moline, IL (US)

(72) Inventors: Gerhard Waldschütz, Freistadt (AT); Wolfgang Schmudermaier, Eisgarn (AT); Florian Drexler, Freistadt (AT); Peter Dobusch, Grünbach (AT)

(*) Notice: Subject to any disclaimer, the term of this patent is extended or adjusted under 35 U.S.C. 154(b) by 919 days.

(21) Appl. No.: 17/436,998

(22) PCT Filed: Feb. 25, 2020

(86) PCT No.: PCT/AT2020/060053
§ 371 (c)(1),
(2) Date: Sep. 7, 2021

(87) PCT Pub. No.: WO2020/181307
PCT Pub. Date: Sep. 17, 2020

(65) Prior Publication Data
US 2022/0181753 A1 Jun. 9, 2022

(30) Foreign Application Priority Data
Mar. 8, 2019 (AT) .............................. A 50187/2019

(51) Int. Cl.
*H01M 50/503* (2021.01)
*A43B 3/40* (2022.01)
*H01M 50/213* (2021.01)

(52) U.S. Cl.
CPC ............. *H01M 50/503* (2021.01); *A43B 3/40* (2022.01); *H01M 50/213* (2021.01)

(58) Field of Classification Search
None
See application file for complete search history.

(56) References Cited

U.S. PATENT DOCUMENTS

| 6,120,564 A | 9/2000 | Marukawa et al. |
| 9,331,315 B1 * | 5/2016 | Goulden ............. H01M 50/522 |

(Continued)

FOREIGN PATENT DOCUMENTS

| CN | 101719540 A | 6/2010 |
| EP | 1914820 A1 | 4/2008 |

(Continued)

OTHER PUBLICATIONS

English language espacenet Abstract for JP2001-185102 A, Jul. 6, 2001.

(Continued)

*Primary Examiner* — Alix E Eggerding
(74) *Attorney, Agent, or Firm* — Tiajoloff & Kelly LLP

(57) ABSTRACT

A device is described for detachable contacting of a battery cell (4) having a cell receptacle open against a joining direction (2), which cell receptacle is delimited by a contact spring base (1), from which contact tongues (3) protrude against the joining direction (2) for the jacket-side enclosure of the battery cell (4). To propose a device for detachable contacting of a battery cell (4), which enables a reliable electrical connection independently of the relative location of the inserted battery cells and substantially independently of their diameter even in the event of periodic mechanical strains, without making the assembling procedure more difficult, it is proposed that the contact tongues (3) have contact bodies (5) protruding radially into the cell receptacle in the form of a cut ovoid.

13 Claims, 1 Drawing Sheet

(56) References Cited

U.S. PATENT DOCUMENTS

Figure 1:
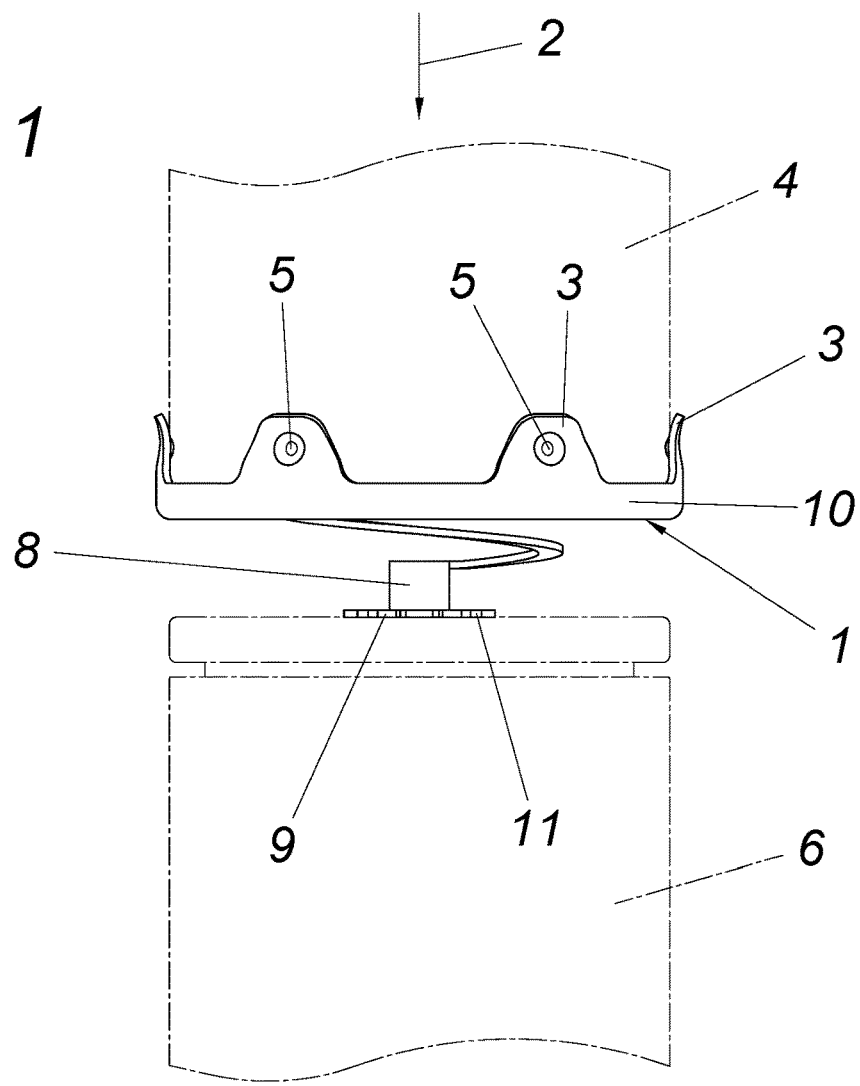

| | | |
|---|---|---|
| 2003/0193313 A1 | 10/2003 | Takedomi et al. |
| 2005/0070164 A1 | 3/2005 | Mita et al. |
| 2008/0182162 A1* | 7/2008 | Kim .................... H01M 50/503 |
| | | 429/99 |
| 2008/0186162 A1 | 8/2008 | Rajan et al. |
| 2009/0104516 A1 | 4/2009 | Yoshihara et al. |
| 2009/0208837 A1 | 8/2009 | Lin |
| 2010/0099024 A1 | 4/2010 | Kim et al. |
| 2016/0285143 A1 | 9/2016 | Rief et al. |
| 2020/0028132 A1* | 1/2020 | Muratsu .............. H01M 50/213 |

FOREIGN PATENT DOCUMENTS

| | | |
|---|---|---|
| EP | 1953849 A1 | 8/2008 |
| EP | 2048723 A1 | 4/2009 |
| EP | 3096372 A1 | 11/2016 |
| JP | 2001-185102 A | 7/2001 |
| JP | 2003-077453 A | 3/2003 |
| WO | 2008/062951 A1 | 5/2008 |
| WO | 2020/181308 A1 | 9/2020 |

OTHER PUBLICATIONS

English language espacenet Abstract for JP2003-077453 A, Mar. 14, 2003.

English language espacenet Abstract for CN101719540A, Jun. 2, 2010.

* cited by examiner

DEVICE FOR MAKING RELEASABLE CONTACT WITH A BATTERY CELL

TECHNICAL AREA

The invention relates to a device for detachable contacting of a battery cell having a cell receptacle open against a joining direction, which cell receptacle is delimited by a contact spring base, from which contact tongues protrude against the joining direction for the jacket-side enclosure of the battery cell.

PRIOR ART

A contact spring for the serial contacting of two battery cells is known from EP3096372A1. The contact spring has contact tongues, which enclose a first battery cell and connect it in a materially bonded manner to a second battery cell. Above all in the case of battery cells which are large, unevenly formed, or seated poorly in the contact spring, a sufficiently high clamping force cannot be applied to the jacket of the battery cell by the contact tongues, because of which in the event of dynamic mechanical strains, sufficiently reliable contacting cannot be ensured for high-capacity battery cells having large diameters, for example round cells of the type 21700. In addition, there is the disadvantage that upon the insertion of the battery cell into the cell receptacle spanned by the contact tongues and in the event of possible relative movements of the battery cell in just this cell receptacle, successive damage of the battery cell jacket and/or a possible oxidation-preventing coating of the contact tongues themselves occurs due to the sharp-edged design of the contact tongues. In addition, due to the varying contact areas between the contact tongues and the battery cell jacket, a variable contact resistance results, which is accompanied by unfavorable electrical operating conditions. For this reason, materially bonded connections between the contact springs and the battery cells are typically preferred.

Therefore, to also achieve a materially bonded connection at contact points which are difficult to access, it has already been proposed (U.S. Pat. No. 6,120,564, EP2087554A1, EP2048723A1, JP2003077453A) that spot welds be provided on the contact springs, which enable a materially bonded connection upon application of a correspondingly high current. However, this has the disadvantage in a comprehensible manner that, neglecting the restrictions in the assembly and the lack of exchangeability of defective battery cells, the currents and temperatures occurring during the welding can result in damage to the battery cells.

DESCRIPTION OF THE INVENTION

The invention is therefore based on the object of proposing a device for detachable contacting of a battery cell, which enables a reliable electrical connection independently of the relative location of the inserted battery cells and substantially independently of their diameter and also in the event of periodic mechanical strains, without making the assembling procedure more difficult.

The invention achieves the stated object in that the contact tongues have contact bodies protruding radially into the cell receptacle in the form of a cut ovoid. In contrast to a contact spring known from the prior art, which would have an undefinable contact area with the battery cell enclosed by the passage depending on the relative location, the contact surface between the contact tongue and the jacket is specified by the provision according to the invention of a contact body in the form of a cut ovoid, preferably in the form of a hemisphere, so that a defined contact resistance results between the contact body or the contact tongue and the battery cell. This contact resistance is substantially constant even in the event of a periodic mechanical deformation of the device as a result of vibrations. Due to the rounded surface of the contact bodies, in addition surface damage can be avoided, particularly the contact bodies can separate the sharp-edged contact tongues from the respective surface jacket of the battery cells.

Improved electrical contacting with simple production conditions at the same time results if the contact bodies are pressed out of the contact tongues. The contact bodies can thus be produced in one work step, wherein the rounded surface to avoid surface damage can be achieved without separate postprocessing. To reduce the surface contamination resistance, the contact bodies can be provided with an oxidation-preventing coating. Such a coating can be produced in one particularly advantageous embodiment of the invention in that the contact tongues are already provided with a coating thickness sufficient for a person skilled in the art before the pressing of the contact bodies, so that after the forming, the contact body surface projecting into the passages has a closed oxidation-preventing coating. For example, nickel or gold can be used as coatings as an oxidation protection to reduce the surface contamination resistance.

To be able to use a device according to the invention even in the case of battery cells degassing at the battery cell base and at the same time to improve the reliable seat of the battery cells in the cell receptacle, it is proposed that the edge of the contact spring base be bent up to form a standing seam, which the contact tongues adjoin. The standing seam encloses the end section of the battery cell jacket, so that a lateral flow out between the contact tongues of the gas flowing at the base out of the battery cell is prevented and the gas can be conducted to a degassing duct provided for this purpose, which adjoins, for example, an opening provided for this purpose in the contact spring base. At the same time, the standing seam results in stiffening of the contact spring base and the contact tongues adjoining thereon, so that in spite of a possible opening to discharge hot gas flowing out of the battery cell, the clamping force of the contact tongues acting on the battery cell jacket can be increased. The electrical conductivity, which increases proportionally with the contact normal force transmitted from the contact bodies, thus also increases. The opening to discharge hot gas flowing out of the battery cell can also be formed, for example, by a meandering or spiral-shaped connection conductor adjoining the contact spring base, which enables a serial connection to a further battery cell.

In order that a gentle insertion of the battery cell into the device can be achieved even with greater clamping force exerted by the contact tongues, it is advantageous in a particularly practical embodiment of the device according to the invention that the contact tongues are convexly curved toward the cell receptacle, wherein the contact bodies are each arranged in the region of the curvature vertex. As a result of these measures, a particularly efficient transmission of the clamping force generated by the contact tongues can be achieved, because the contact normal force acting on the battery cell jacket is maximized and the constriction resistance is minimized. Although the stiffness of the contact tongues is increased by the curvature according to the invention, the insertion process of the battery cell can be facilitated by the cross-sectional area of the cell receptacle spanned by the contact tongues, which expands toward the vertex against the joining direction.

BRIEF DESCRIPTION OF THE INVENTION

Figure 2:
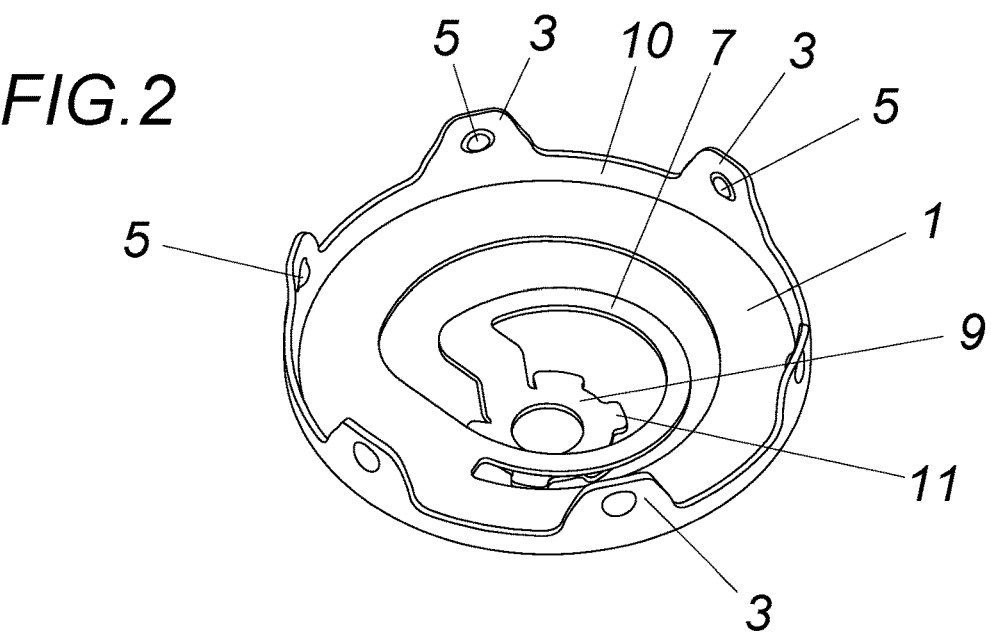

The subject matter of the invention is illustrated as an example in the drawing. In the figures FIG. 1 shows a side view of a device according to the invention electrically connecting two battery cells to one another and FIG. 2 shows a perspective illustration of an exemplary embodiment of the device according to the invention in a larger scale.

WAYS OF EMBODYING THE INVENTION

A device according to the invention has a contact spring base 1 having contact tongues 3 protruding out of the contact spring base 1 against a joining direction 2. To enclose a first battery cell 4 shown in FIG. 1 and electrically connect it, the contact tongues 3 are arranged on the circumference on the contact spring base 1 and thus form a cell receptacle open against the joining direction 2. The first battery cell 4 is detachably connected to the device by the contact tongues 3, whereby, on the one hand, a tolerance compensation enabled by relative movements of the battery cell 4 to the cell receptacle is achieved in the event of periodic mechanical operating conditions and, on the other hand, the assembling procedure when inserting the battery cell 4 into the cell receptacle is facilitated. To ensure operationally reliable and uniform contacting in spite of this detachable connection, the contact tongues 3, as can preferably be seen in FIG. 2, have ovoid contact bodies 5 on the battery jacket side, which are arranged in the region of the curvature vertex of the contact tongues 3. Due to this special geometry, an approximately congruent contact area is provided on all contact tongues 3 independently of the relative location of the battery cell 4 to the cell receptacle. Due to the fact that the ovoid contact bodies 5 are created by a pressure forming method, for example by indentation, damage to possible prefinished coatings can be prevented, whereby the life cycle of the battery 4 is significantly lengthened.

If the device is used for the serial contacting of two battery cells 4, 6, a meandering connection conductor 7 can thus originate from the contact spring base 1, which has a pole receptacle 9 circumferentially enclosing a pole 8 of the battery cell 6 for a materially bonded connection to the second battery cell 6. A mechanical tolerance compensation in and against the joining direction 2 can take place due to the meandering design of the connection conductor 7, which is apparent in particular in FIG. 2, wherein the narrow web of the connection conductor 7 can at the same time be used as a fuse in the event of overcurrents.

Particularly gentle joining conditions result if the contact tongues 3 have a rounded taper against the joining direction 2 and a convex curvature against the battery receptacle, toward the battery cell 4, whereby, above all if the edge of the contact spring base 1 is bent up to form a standing seam 10, a sufficiently high clamping force for secure contacting can be generated even with large-dimensioned battery cells. The standing seam 10 advantageously adjoins the battery cell 4 in a formfitting manner, so that a lateral escape of degassing flows possibly escaping at the base from the battery cell 4 can be prevented. To also enable the most process-reliable materially bonded connection possible between the pole 8 of the battery cell 6 and the pole receptacle 9, the pole receptacle 9 has circumferentially arranged alignment fins 11, which can function for the alignment as a stop surface for, for example, a welding iron.

The invention claimed is:

1. A device for detachable contact with a battery cell, having said device comprising:
   a cell receptacle having an opening facing a joining direction,
   said cell receptacle being delimited by a contact spring base from which contact tongues protrude in a direction opposite to the joining direction so as to form a jacket-side enclosure of the battery cell,
   wherein the contact tongues have contact bodies providing detachable engagement contact with the battery cell and protruding radially into the cell receptacle;
   wherein the surfaces of the contact bodies each have respective surfaces with a contact surface providing electrical contact with the battery cell;
   said surfaces of the contact bodies having a shape corresponding to a portion of an ovoid shape that is convex toward the cell receptacle, and wherein the surfaces extend away from the associated contact surfaces, curving away from the battery cell in all directions.

2. The device according to claim 1, wherein the contact bodies are pressed out of the contact tongues.

3. The device according to claim 2, wherein the contact spring base has an edge that is bent up so as to form a standing seam to which the contact tongues adjoin.

4. The device according to claim 3, wherein the contact tongues have a cross-section in a plane extending in the joining direction that is convexly curved toward the cell receptacle, and wherein the contact bodies are each arranged in a region of a convex curvature vertex of the respective contact tongue.

5. The device according to claim 3, wherein the contact bodies are in a form of a hemisphere that is convex toward the battery cell.

6. The device according to claim 2, wherein the contact tongues have a cross-section in a plane extending in the joining direction that is convexly curved toward the cell receptacle, and wherein the contact bodies are each arranged in a region of a curvature vertex of the respective contact tongue.

7. The device according to claim 2, wherein the contact bodies are in a form of a hemisphere that is convex toward the battery cell.

8. The device according to claim 1, wherein the contact spring base has an edge that is bent up so as to form a standing seam to which the contact tongues adjoin.

9. The device according to claim 8, wherein the contact tongues have a cross-section in a plane extending in the joining direction that is convexly curved toward the cell receptacle, and wherein the contact bodies are each arranged in a region of a curvature vertex of the respective contact tongue.

10. The device according to claim 8, wherein the contact bodies are in a form of a hemisphere that is convex toward the battery cell.

11. The device according to claim 1, wherein the contact tongues have a cross-section in a plane extending in the joining direction that is convexly curved toward the cell receptacle, and wherein the contact bodies are each arranged in a region of a curvature vertex of the respective contact tongue.

12. The device according to claim 11, wherein the contact bodies are in a form of a hemisphere that is convex toward the battery cell.

13. The device according to claim 1, wherein the contact bodies are in a form of a hemisphere that is convex toward the battery cell.

* * * * *